United States Patent
Chiba et al.

(10) Patent No.: US 8,756,523 B2
(45) Date of Patent: Jun. 17, 2014

(54) TERMINAL, HISTORY MANAGEMENT METHOD, AND COMPUTER USABLE STORAGE MEDIUM FOR HISTORY MANAGEMENT

(75) Inventors: Ohki Chiba, Tokyo (JP); Satoshi Aida, Tokyo (JP); Kazuhiro Arima, Ichikawa (JP); Masayuki Nagamachi, Chiba (JP)

(73) Assignee: Access Co., Ltd., Chiyoda-ku (JP)

(*) Notice: Subject to any disclaimer, the term of this patent is extended or adjusted under 35 U.S.C. 154(b) by 405 days.

(21) Appl. No.: 12/602,086

(22) PCT Filed: May 26, 2008

(86) PCT No.: PCT/JP2008/059648
§ 371 (c)(1),
(2), (4) Date: Nov. 25, 2009

(87) PCT Pub. No.: WO2008/146784
PCT Pub. Date: Dec. 4, 2008

(65) Prior Publication Data
US 2010/0180225 A1  Jul. 15, 2010

(30) Foreign Application Priority Data
May 29, 2007  (JP) .................. 2007-141631

(51) Int. Cl.
| | | |
|---|---|---|
| G06F 3/048 | (2013.01) | |
| G06F 17/30 | (2006.01) | |
| G06F 3/0481 | (2013.01) | |
| H04M 1/725 | (2006.01) | |

(52) U.S. Cl.
CPC ..... *G06F 17/30905* (2013.01); *H04M 1/72561* (2013.01); *G06F 3/0481* (2013.01)
USPC ............ 715/777; 715/738; 715/838

(58) Field of Classification Search
CPC .......... G06F 17/30873; G06F 3/0483
USPC ................ 715/777, 733, 738, 838
See application file for complete search history.

(56) References Cited

U.S. PATENT DOCUMENTS 6,049,812 A    4/2000 Bertram et al.
7,176,888 B2 *  2/2007 Marvit et al. ................. 345/156
(Continued)

FOREIGN PATENT DOCUMENTS

JP  10-207806 A  8/1998
JP  11-338810 A  12/1999
(Continued)

OTHER PUBLICATIONS

International Preliminary Report on Patentability and Written Opinion received for PCT Patent Application No. PCT/JP2008/059648, mailed on Jan. 21, 2010, 7 pages.

(Continued)

*Primary Examiner* — Daeho Song
(74) *Attorney, Agent, or Firm* — Baker & Hostetler LLP

(57) ABSTRACT

A terminal device which can access Web contents individually for each window, the terminal device comprising a history storing means for associating each of histories of Web contents with predetermined image information, and storing the histories of the Web contents so that the histories of the Web contents can be managed for each window, an input means for receiving user's input operations, an image retrieving means for retrieving the image information by referring to the histories of each window, when a predetermined input operation is received, an image arranging means for arranging the retrieved image information for each window in a row, which is made to be in correspondence with each window, in a time series by referring to the histories, and displaying the arranged image information on a screen, and a focusing means for focusing on one piece of the arranged image information in response to the input operation.

23 Claims, 9 Drawing Sheets

(56) References Cited

U.S. PATENT DOCUMENTS

| | | | |
|---|---|---|---|
| 7,574,669 B1* | 8/2009 | Braun et al. | 715/777 |
| 2002/0072049 A1* | 6/2002 | Prahalad | 434/365 |
| 2002/0093537 A1* | 7/2002 | Bocioned et al. | 345/777 |
| 2005/0015726 A1* | 1/2005 | Tuominen | 715/733 |
| 2005/0073497 A1* | 4/2005 | Kim | 345/158 |
| 2005/0180728 A1* | 8/2005 | Ichioka et al. | 386/46 |
| 2005/0183030 A1* | 8/2005 | Bertram et al. | 715/800 |
| 2005/0216867 A1* | 9/2005 | Marvit et al. | 715/863 |
| 2005/0223324 A1* | 10/2005 | Tashiro | 715/527 |
| 2006/0101330 A1* | 5/2006 | Godley | 715/513 |
| 2007/0006100 A1* | 1/2007 | Roto et al. | 715/853 |
| 2007/0050445 A1* | 3/2007 | Hyndman | 709/203 |
| 2007/0143701 A1* | 6/2007 | Iremonger et al. | 715/777 |
| 2007/0150828 A1* | 6/2007 | Tsukada et al. | 715/777 |
| 2007/0220441 A1* | 9/2007 | Melton et al. | 715/781 |
| 2008/0005686 A1* | 1/2008 | Singh | 715/764 |
| 2008/0184158 A1* | 7/2008 | Selig | 715/781 |
| 2008/0294974 A1* | 11/2008 | Nurmi et al. | 715/204 |
| 2010/0042936 A1* | 2/2010 | Ooga et al. | 715/764 |

FOREIGN PATENT DOCUMENTS

| | | | |
|---|---|---|---|
| JP | 2002-073684 A | 3/2002 | |
| JP | 2007-179282 A | 7/2007 | |

OTHER PUBLICATIONS

Office Action received for Chinese Patent Application No. 200880017596.9, issued on Aug. 10, 2011, 8 pages (5 pages of English Translation and 3 pages of Office Action).

Aoyagi, Hideo (Jun. 1, 2006). "Tanki Shuchu Rensai Web Seisaku no Tameno Firefox Kakucho Kiino Satalog Series #3," *Web Designing* 6(6):113.

HAC (Feb. 1, 2006). "Tokushu 1 Kimon, Nanmon, Chinmon Darake no Netoranryu Test Jisshi Wakariyasui Kaisetsu Tsuki Dakara Jitsuryoku ga Gun to Josho!! Netoran Center Shiken Moshi," *Net Runner* 8(2):62.

International Search Report mailed Jun. 24, 2008, for PCT Application No. PCT/JP2008/059648 filed May 26, 2008, 2 pages (English translation 2 pages).

Office Action received for Japanese Patent Application No. 2009-516313, mailed on Apr. 10, 2013, 8 pages (4 pages of English Translation and 4 pages of Official Copy).

* cited by examiner

TERMINAL, HISTORY MANAGEMENT METHOD, AND COMPUTER USABLE STORAGE MEDIUM FOR HISTORY MANAGEMENT

TECHNICAL FIELD

The present invention relates to a terminal device, a history management method, and a history management program that manage a history of each window, especially tab windows, and that can provide the history to a user.

BACKGROUND OF THE INVENTION

Information browsing software for browsing information on a network (hereinafter, written as "browser") is provided widely for practical use. In a browser, a function to analyze information on a network (for example, a Web page which is a document described in a markup language such as an HTML (Hyper Text Markup Language)) and to perform rendering based on the result of the analysis is implemented. A user can browse an intended Web page on a browser by specifying a URI (Uniform Resource Identifier).

In such a browser, various functions to improve user's usability are provided. As one of such functions, there exists a history management function to manage a history of URIs which were accessed before. A user can access a URI, which is managed by the history management function, for example, by only clicking a back button or a forward button on a browser. Namely, the history management function enables a user to access a URI which was browsed before with a simple operation without entering the URI manually or searching the URI again with a search engine.

Further, there exists a browser with an advanced GUI (Graphical User Interface) environment which can display a browser history of a URI (hereinafter, referred to as "history") through a thumbnail. For example, Japanese Patent Provisional Publication No. 2002-73684A (hereinafter, written as document 1) discloses a browser which can display a history or a result of search by a search engine through a thumbnail. According to document 1, a more comfortable GUI, which visually presents a history to a user, is provided.

DISCLOSURE OF THE INVENTION

For example, plural windows (for example, a window including a menu bar, a tool bar, and an address bar, and for the sake of simplicity, it is referred to as a "main window") are activated in order to browse plural Web contents with the browser described in above document 1. In this case, in order to switch to a desired Web content, complicated operations, for example, such as calling up another main window which is hidden behind the currently browsed main window, are required.

Recently, tab browsers have come into wide use. With a tab browser, plural Web contents can be switched to be displayed within one main window. In a tab browser, plural tabs are displayed within one main window. When a tab is selected, the display on the tab browser is switched to a tab window associated with the selected tab. Since a Web content can be switched by selecting a tab in a main window placed in the front, it has an advantage that the complexity of the operations described above is overcome.

A tab browser also includes a history managing function. In this case, however, it is likely that it is not possible to find which content has been browsed in which tab window, after the Web contents are switched many times to be browsed. When a history is used to find a Web content, which a user wants to browse again, a user is required to perform extremely complicated operations. The operations include to select a tab window and investigate the history of the tab window, and if the Web content is not found, to select another tab window and investigate the history of the tab window. Attention should be paid that, especially for a terminal with a thin user interface such as a mobile telephone, a function which requires complicated operations tends to be avoided and not to be used by a user.

Thus, taking the above circumstances into considerations, it is an object of the present invention to provide a terminal device, a history management method, and a computer usable storage medium for history management, with which an intended history can be found through simple operations.

A terminal device which can access Web contents individually for each window, according to an embodiment of the present invention to solve the above problem, is the terminal device characterized in that it includes a history storing means for associating each of histories of Web contents with predetermined image information, and storing the histories of the Web contents so that the histories of the Web contents can be managed for each window; an input means for receiving user's input operations; an image retrieving means for retrieving the image information by referring to the histories of each window, when a predetermined input operation is received; an image arranging means for arranging the retrieved image information for each window in a row, which is made to be in correspondence with each window, in a time series by referring to the histories, and displaying the arranged image information on a screen; and a focusing means for focusing on one piece of the arranged image information in response to the input operation.

According to this configuration, since histories of plural windows are displayed on a screen, so that histories are selectable, a user can easily find an intended history with a seamless operational feeling, without feeling the difference among windows.

Here, the above input means can be configured to include a first directional key to shift the focus in a first direction, and a second directional key to shift the focus in a second direction which is perpendicular to the first directional key. In this case, the focusing means can shift the focus in a direction corresponding to an operation of the first directional key or the second directional key, and can change the image information to be focused.

Further, for example, the above image arranging means can be configured, at least, to arrange image information corresponding to histories of an active window in a row corresponding to the first direction in a time series, and arrange image information corresponding to a Web content which is lastly displayed by a window except for the active window in the second direction.

The image arranging means can be configured to arrange image information corresponding to histories of an active window in a row corresponding to a first direction, and at the same time, for a Web content which is lastly displayed by a window except for the active window, arrange a message, which shows that it is possible to switch to the window, in a second direction.

Further, a terminal device which can access Web contents individually for each window, according to another embodiment of the invention to solve the above problem, is a terminal device characterized in that it includes a history storing means for associating each of histories of Web contents with predetermined image information, and storing the histories of the Web contents so that the histories of the Web contents can be managed for each window, an input means for receiving user's input operations, an image retrieving means for retrieving pieces of image information corresponding to a Web content which is in a state in which the Web content is currently browsed on an active window, Web contents which are accessed before and after the Web content, and Web contents which are lastly displayed on windows except for the active window, respectively, by referring to histories of each window, an image arranging means for arranging the pieces of image information in such a way that the piece of image information of the Web content which is in the state in which the Web content is browsed is placed at the center a screen, the pieces of image information of the Web contents which are accessed before and after are placed at a left part and a right part of the screen, the pieces of image information of the Web contents which are lastly displayed on the windows except for the active window are placed at an upper part and lower part of the screen, and a focusing means for focusing on one of the arranged pieces of image information.

According to this configuration, since histories of plural windows are displayed on a screen, so that histories are selectable, a user can easily find an intended history with a seamless operational feeling, without feeling the difference among windows.

Further, the above input means can be configured to include a first directional key for moving the focus of pieces of image information in the horizontal direction of the screen and a second directional key for moving the focus of pieces of image information in the vertical direction of the screen. In this case, the above terminal device can be configured to further include an image arrangement changing means for changing the arrangement of the pieces of image information on the screen so that the pieces of image information placed in the horizontal direction slide in the horizontal direction in accordance with an amount of operations on the first directional key, the pieces of image information of each window placed in the vertical direction slide in the vertical direction in accordance with an amount of operations on the second directional key, and the pieces of image information of the window corresponding to the piece of image information placed at the center of the screen are arranged in a time series in the horizontal direction of the screen.

Further, the above terminal device can be configured to further include, for example, a display magnification changing means for changing a magnification on the group of the pieces of image information arranged on the screen.

Further, the above terminal device can be configured, for example, such that when a magnification on a piece of image information which is currently displayed attains a predetermined magnification, the terminal device accesses a Web content by referring to a history corresponding to the piece of image information.

Further, the above terminal device can be configured, for example, such that when an input operation for deciding to select a piece of image information which has been focused is made, the terminal device accesses a Web content by referring to a history corresponding to the piece of image information.

Further, the above terminal device can be configured to further include, for example, a thumbnail generating means for generating a thumbnail of a Web content, which has been accessed, as the predetermined image information.

Further, in the above terminal device, for example, each window can be a tab window which is opened on a single main window.

Further, in the above terminal device, for example, each window can be a tab window which is opened on a single main window, and the windows except for the active window can be tab windows whose tabs are neighboring to a tab of the active tab window on a tab bar of the main window.

Further, the above terminal device can be configured, for example, such that the input means is a touch panel, and the focusing means focuses on a piece of image information which is selected on a touch panel.

Further, a history management method according to an embodiment of the invention to solve the above problem is a method including a history storing step of associating each of histories of Web contents with predetermined image information, and storing the histories of the Web contents so that the histories of the Web contents can be managed for each window, an image retrieving step of retrieving the image information by referring to the histories of each window, when a predetermined input operation by a user is received, an image arranging step of arranging the retrieved image information for each window in a row, which is made to be in correspondence with each window, in a time series by referring to the histories, and displaying the arranged image information on a screen, and a focusing step of focusing on one piece of the arranged image information in response to the input operation.

According to this method, since histories of plural windows are displayed on a screen, so that histories are selectable, a user can easily find an intended history with a seamless operational feeling, without feeling the difference among windows.

The image arranging step can arrange image information corresponding to histories of an active window in a row corresponding to a first direction in a time series, at the same time, for a Web content which is lastly displayed by a window except for the active window, the image arranging step can arrange a message, which shows that it is possible to switch to the window, in a second direction.

Further, the history management method according to another embodiment of the invention to solve the above problem is a method including a history storing step of associating each of histories of Web contents with predetermined image information, and storing the histories of the Web contents so that the histories of the Web contents can be managed for each window, an image retrieving step of retrieving pieces of image information corresponding to a Web content which is in a state in which the Web content is currently browsed on an active window, Web contents which are accessed before and after the Web content, and Web contents which are lastly displayed on windows except for the active window, respectively, by referring to histories of each window, when a predetermined input operation by a user is received, an image arranging step of arranging the pieces of image information in such a way that the piece of image information of the Web content which is in the state in which the Web content is browsed is placed at the center of a screen, the pieces of image information of the Web contents which are accessed before and after are placed at a left part and at a right part of the screen, the pieces of image information of the Web contents which are lastly displayed on the windows except for the active window are placed at an upper part and at a lower part of the screen, and a focusing step of focusing on one of the arranged pieces of image information.

According to this method, since histories of plural windows are displayed on a screen, so that histories are selectable, a user can easily find an intended history with a seamless operational feeling, without feeling the difference among windows.

Here, the above history management method can further include, for example, an image arrangement changing step of changing the arrangement of the pieces of image information on the screen so that when an input operation for moving a subject of focus to the pieces of image information at the left part or at the right part of the screen is received, the pieces of image information placed in the horizontal direction slide in a direction corresponding to the input operation, when an input operation for moving the subject of focus to the pieces of image information at the upper part or at the lower part of the screen is received, the pieces of image information of each window placed in the vertical direction slide in a direction corresponding to the input operation, and the pieces of image information of the window corresponding to the piece of image information placed at the center of the screen are arranged in a time series in the horizontal direction of the screen.

Further, the above history management method can further include, for example, a display magnification changing step of changing a magnification on the group of the pieces of image information arranged on the screen.

Further, the above history management method can be, for example, such that when a magnification on a piece of image information which is currently displayed reaches a predetermined magnification, a Web content is accessed by referring to a history corresponding to the piece of image information.

Further, the above history management method can be, for example, such that when an input operation to decide to select a piece of image information which has been focused is made, a Web content is accessed by referring to a history corresponding to the piece of image information.

Further, the above history management method can further include, for example, a thumbnail generating step of generating a thumbnail of a Web content, which has been accessed, as the predetermined image information.

Further, in the above history management method, for example, each window can be a tab window which is opened on a single main window.

Further, in the above history management method, for example, each window can be a tab window which is opened on a single main window, and the windows except for the active window cab be tab windows whose tabs are neighboring to a tab of the active window on a tab bar of the main window.

Further, according to an embodiment of the invention to solve the above problem, a computer usable storage medium having computer readable instructions for causing a computer to perform the history management method described in any of the above descriptions is provided.

According to this computer usable storage medium, since histories of plural windows are displayed on a screen, so that histories are selectable, a user can easily find an intended history with a seamless operational feeling, without feeling the difference among windows.

BEST MODE FOR CARRYING OUT THE INVENTION

Hereinafter, the invention is explained by referring to figures.

First, terms used in this specification are defined.

Network

Various types of communications networks, including a network of a carrier, an intranet, and the Internet.

Content

A group of pieces of information which is transmitted through a network or stored in a terminal, including video, images, audio, texts, or a combination thereof, which is enjoyed by a user.

Web Content

A form of a content. A collection of information transmitted through a network.

Web Page

A form of a Web content. The whole substance displayed when a URI is specified by a user. Namely, the whole substance which can be displayed by scrolling an image on a display. Further, Web pages include not only Web pages which can be browsed online, but also Web pages which can be browsed offline. The Web pages which can be browsed offline include, for example, pages which are transmitted through the Internet and cached by a browser, or pages which are stored in a local folder of a terminal device in mht form. A Web page includes various types of data (Web page data), for example, an HTML document, an image file, or audio data.

Web Site

A group of Web pages under a specific domain name. Typically, it includes one top page and plural Web pages linked to the top page directly or indirectly.

According to the above definition, contents include Web contents, and Web contents include Web sites and Web pages.

FIG. 1 is a diagram illustrating an external appearance of a terminal device 10 according to an embodiment of the invention. Also, FIG. 2 is a block diagram illustrating architecture of a terminal device according to the embodiment of the invention. In the embodiment, the terminal device 10 is a mobile telephone. In another embodiment, the terminal device 10 can be various types of devices, for example, a desktop or laptop PC (Personal Computer), a PDA (Personal Digital Assistants), a PHS (Personal Handy phone System), or a mobile game device.

The terminal device 10 includes a CPU (Central Processing Unit) 103 which integrally executes control of the entirety of the device. The CPU 103 is connected to each component through a bus 119. The CPU 103 realizes various functions by executing data communication through the bus 119 and exchanging with each component. The components include a ROM (Read-Only Memory) 105, a RAM (Random-Access Memory) 107, a network interface 109, a display 111, a user interface device 113, and a flash memory 115.

The ROM 105 stores various programs and various data. The programs stored in the ROM 105 include, for example, a browser 50. The browser 50 is information browsing software for browsing information described in a predetermined markup language, online or offline.

In the RAM 107, various programs stored in the ROM 105, for example, are expanded. In accordance with user operations (hereinafter, simply written as "user operation") using the user interface device 113, a program stored in the ROM 105 (the browser 50, for example) is read out, the program is expanded in a predetermined area in the RAM 107 and executed. In this manner, the browser 50 is activated, and a user can perform Web browsing. Further, a 5-way key or a 10 key is implemented in the terminal device 10 as the user interface device 113. A signal corresponding to an operational key which is pushed by a user is input to the CPU 103, and the CPU 103 executes a process corresponding to the input signal when executing the program expanded in the RAM 107. With this configuration, various functions including a function for Web browsing are accomplished in the terminal device 10. Further, for the sake of simplicity of the explanation, a decision key, an upward key, a downward key, a left directional button, and a right directional key, which are included in the 5-way key, are marked with symbols "113C," "113U," "113L," and "113R," respectively.

Here, functions of the browser 50 are explained. A browser engine 30 which is the fundamental component of the browser 50 is explained by referring to FIG. 3.

FIG. 3 is a block diagram of the browser engine 30 included in the browser 50. As shown in FIG. 3, the browser engine 30 includes functional blocks corresponding to a parser 31 and a formatter 33.

When a URI is input through user operations (or a URI is specified by selecting an anchor tag included in a Web page, or a URI stored in the terminal device 10 as a bookmark or a history is selected), a request for an HTML document 21 is transmitted to the specified URI on the Internet. A server corresponding to the specified URI, which have received the request, transmits the HTML document 21 placed in the specified URI to the browser 50, in response to the request. The HTML document 21 is passed to the parser 31 through a predetermined network, such as the Internet, and the network interface 109.

The parser 31 analyzes the HTML document 21 and generates a document tree 23 (for example, a DOM (Document Object model) tree) in which grammatical structure of the HTML document 21 is expressed in tree structure. Further, the document tree 23 is data representing an outline of the markup document 21 which has each element of the markup document 21 as a node. The document tree 23 merely represents grammatical structure of the HTML document 21, and the document tree 23 does not include information about expression of the document. Next, based on information about the document tree 23, tags, and style sheets, a layout tree including a form of expression of the HTML document 21, for example, such as block, inline, table, list, and item is generated. The layout tree expresses the order, according to which block, inline, and table exist. The layout tree, however, does not include information about places on the screen of the terminal side at which these elements (block, inline, table, etc.) are displayed, information about widths and heights with which these elements are expressed, and places at which the text is folded.

Based on information about the layout tree and information about specification of the terminal device 10 (for example, the size of the screen of the display 111 or an aspect ratio), the formatter 33 determines a layout of each element (for example, folding of text in accordance with the number of pixels in the width direction of the screen; place, width, and height of each element on the screen), on the display 111. Next, based on the determined layout, rendering is performed and drawing data is generated. The generated drawing data is expanded in a video memory area of the RAM 107, for example. In this manner, the HTML document 21, namely, the requested page is displayed on the display 111.

The browser 50 is further explained. FIG. 4 illustrates an example of a display screen on the browser 50. As shown in FIG. 4, the browser 50 is a tab browser including a tab function (hereinafter, the tab browser 50), and for each tab window, the browser 50 obtains a Web page, which is specified with user operations, through the sequence of processes and displays the Web page. According to the example of FIG. 4, the tab browser 50 opens three tab windows corresponding to a tab Ta, a tab Tb, and a tab Tc, respectively, and the tab browser 50 is in a state in which various Web pages are accessed with respective tab windows.

Only one tab window can be displayed at a time on the tab browser 50. Hereinafter, a tab window which is currently displaying a Web page is written as "an active window," In the example of FIG. 4(a), the tab window associated with the tab Ta (hereinafter, it is called "tab window Wa," the same rule applies to attach marks on the other tab windows) is the active window. Also, hereinafter, the last Web page displayed on each tab window is written as "current page." According to the example of FIG. 4(a), the current page CPa corresponding to the tab window Wa is the currently displayed Web page. If an active window is switched to another tab window from the state of FIG. 4(a), the current page CPa remains pointing to the same Web page. Therefore, the current pages CPb, CPc of the tab windows Wb, Wc are the last Web pages displayed when CPb and CPc were active windows, respectively. Further, the tab corresponding to the active window (here, the tab Ta) is highlighted as illustrated in FIG. 4(a). Furthermore, in FIG. 4, each tab is illustrated with a blank. However, in practice, a title of a current page (or a focused page in a history referencing mode described later) is displayed on each tab.

The tab browser 50 manages, for each tab window, tab window information. The tab window information includes, for example, the URI of the current page, or information regarding whether the tab window is an active window or not. The tab browser 50 rewrites the corresponding tab window information, each time transition of Web pages or switching of windows arises. The tab browser 50 can specify a current page or an active window by referring to the tab window information.

The tab browser 50 generates a history and stores the history in a predetermined area of the RAM 107 (for example, in a temporary folder), each time the tab browser 50 accesses a Web page. The histories are managed individually for each tab window. The substance of a history is URIs of the contents which have been accessed, information about the active windows at the time the URIs have been accessed, the titles of the contents, and data associated with thumbnails corresponding to the URIs. The history is managed in time series in accordance with the order of the accesses. Further, for the sake of simplicity of the explanation, the set of at least one history for each tab window, which is stored in the temporary folder, is written as "a history group."

Titles included in the substance of a history are, for example, when contents are Web pages, the titles of the Web pages. When accessing a new URI, for example, the tab browser 50 extracts the title of the Web page, which was displayed on the screen immediately before accessing the new URI, for a thumbnail, by referring to the title attribute of the Web page.

Further, a thumbnail included in the substance of a history is, for example, an image in which the Web pages which have been accessed are captured. For example, when accessing a new URI, the tab browser 50 captures the Web page which was displayed on the screen immediately before accessing the new URI. Therefore, in the case of a Web page with a size that the whole Web page cannot be fit in one screen, the tab browser 50 captures a portion of the area of the Web page which is displayed on the screen. After generating a thumbnail, the tab browser 50 associates the URI of the Web pages, the extracted title, and the information about the currently active window with the generated thumbnail, and thereby generating a history.

Further, a number of histories that can be managed for each tab window, namely, the maximum number of histories included in each history group is set to a predetermined number, and the predetermined number is determined by considering the resource of the terminal device 10, for example. The number can be 20, for instance, and when the number of histories exceeds 20, the latest history is stored after the oldest history is deleted. Further, the maximum number of histories included in each history group can be enlarged when the resource of the terminal device 10 is rich. Furthermore, when the tab window is closed, the history group corresponding to the tab window is deleted.

Here, when the "Menu" button at the right bottom part of the screen is selected, the tab browser 50, for example, pops up the menu on the screen. When an item included in the menu is selected, the function corresponding to the item is executed. For example, "history reference" is included as one of the items of the menu. When the "history reference" is selected, the tab browser 50 transits to a history referencing mode. Hereinafter, the processes executed by the tab browser 50, after the "history reference" is selected, are explained in detail. Further, in order to reduce the operational burden on a user, the tab browser 50 can be configured so that the tab browser 50 can transit to the history referencing mode by using a shortcut function (for example, by pressing plural special keys placed in the user interface device 113 simultaneously).

When the mode transits to the history referencing mode with the state of FIG. 4 (a), the display on the screen is changed to the display shown in FIG. 4 (b). According to an example of FIG. 4 (b), the thumbnail $TN_{CPa}$ of the current page CPa in FIG. 4 (a) is displayed on the center of the screen, and other thumbnails are displayed on the upper part, the lower part, the right part, and the left part of the thumbnail. Specifically, the thumbnail $TN_{CPc}$ is displayed on the upper part of the screen, and the thumbnail $TN_{CPb}$ is displayed on the lower part of the screen. Further, the thumbnail $TN_{fw}$ is displayed on the right part of the screen, and the thumbnail $TN_{bk}$ is displayed on the left part of the screen. Furthermore, the display of each tab remains the same as the displays of the tabs in FIG. 4 (a).

The screen of FIG. 4 (b) is generated by the tab browser through executing a thumbnail displaying process. Here, FIG. 5 illustrates a flowchart of the thumbnail displaying process. The thumbnail displaying process is explained using FIG. 5.

According to the flowchart of FIG. 5, when the tab browser 50 receives user operations for transit to the history referencing mode, first, the tab browser 50 searches for the current page from the history group of the active window based on the tab window information. Next, the tab browser 50 retrieves the thumbnail of the current page, which is obtained as a result of the search, and the tab browser 50 stores the thumbnail in a working area of the RAM 107 (Step 1, hereinafter, a step is abbreviated as "S" in the specification and in the figures). Further, the tab browser 50 searches the histories displayed before and after the current page (namely, the Web page which was accessed after the current page, the Web page which was accessed immediately before the current page), and retrieves the corresponding thumbnail and stores the thumbnail in a working area of the RAM 107 (S2). In the embodiment, the thumbnail $TN_{CPa}$ of the current page CPa is retrieved in the process of S1, and the thumbnail $TN_{fw}$ of the Web page, which was accessed after the current page CPa (hereinafter, it is written simply as "the thumbnail $TN_{fw}$ next to the thumbnail $TN_{CPa}$"), and the thumbnail $TN_{bk}$ immediately before the thumbnail $TN_{CPa}$ are retrieved in the process of S2.

Further, if the current page is the latest page which is accessed by the tab browser 50, since the timing in which the history is generated is the timing in which the URI is accessed, there is no history corresponding to the current page. To avoid this, the tab browser 50 of the embodiment generates a history corresponding to the latest pages which are accessed by respective tab windows at the time the thumbnail displaying process of FIG. 5 is started.

If the current page is the latest page which is accessed by the tab browser 50, then at the process of S2, the tab browser 50 searches the history corresponding to immediately before the current page and the oldest history in the history group, and retrieves corresponding thumbnails and stores them in a working area of the RAM 107. Conversely, if the current page is the Web page corresponding to the oldest history in the history group, then the tab browser 50 searches the history corresponding to after the current page and the latest history, and retrieves corresponding thumbnails and stores them in a working area of the RAM 107. This is because the latest history in the history group and the oldest history in the history group are managed as histories which are in an anteroposterior relationship, when they are viewed in a time series. With this type of management, for each history in a history group, there are two histories which are in an anteroposterior relationship.

Next, the tab browser 50 determines whether there exists an open tab window other than the active window or not (S3). According to the example of FIG. 4, in addition to the active window (tab window Wa), the tab windows Wb and Wc are open (S3: YES), so the process proceeds to S4. On the other hand, if there is no open tab window other than the active window, namely, if there is only one open window (S3: NO), then the process proceeds to S5.

In the process of S4, the tab browser 50 searches for the current page from the history groups of the neighboring tab windows based on the tab window information. Next, the tab browser 50 retrieves the thumbnail of the current page, which is obtained as a search result, and stores the thumbnail in a working area of the RAM 107.

Here, the neighboring tab windows mean tab windows whose tabs are neighboring to the tab of the active window on the tab bar of the tab browser 50. For example, when the tab window Wb is the active window, the neighboring tab windows are the tab windows Wa and Wc whose tabs Ta and Tc are neighboring to the tab Tb. Further, the tab browser 50 recognizes the tabs placed at the rightmost side and the leftmost side on the tab bar as neighboring tabs. Therefore, according to the example of FIG. 4, the tab windows Wb and Wc are the neighboring tab windows. In the embodiment, the thumbnail $TN_{CPb}$ of the current page CPb and the thumbnail $TN_{CPc}$ of the current page CPc are retrieved at the process of S4.

At the process of S5, the tab browser 50 generates drawing data in which the thumbnails retrieved at respective processes are arranged in a predetermined arrangement. Specifically, the tab browser 50 generates the drawing data to place the thumbnail $TN_{CPa}$ (the thumbnail of the current page of the active window), which is retrieved at the process of S1, to the center of the screen, the thumbnail $TN_{fw}$ and the thumbnail $TN_{bk}$ (the thumbnail after the above mentioned thumbnail and the thumbnail immediately before the above mentioned thumbnail), which are retrieved at the process of S2, to the right part of the screen and to the left part of the screen, respectively, and the thumbnail $TN_{CPc}$ and the thumbnail $TN_{CPb}$ (the thumbnails of the current windows of the neighboring tab windows), which are retrieved at the process of S4, to the upper part of the screen and to the lower part of the screen, respectively.

Although the thumbnails for respective histories are generated with the same size, at the process of S5, the tab browser 50 draws the thumbnail $TN_{CPa}$ with a greater size than the sizes of the thumbnails surrounding the screen. Furthermore, only a part of each thumbnail surrounding the screen is displayed on the screen. According to this mode of display, visibility of the browsed page immediately before transition to a history referencing mode is ensured, and it is very effective for a terminal device with a small screen size, for example. When the size of the screen is large enough, the whole part of each thumbnail surrounding the screen can be displayed.

Further, the tab browser 50 obtains the title of the current page of each tab window by referring to each thumbnail, in parallel with the processes from S1 to S4. Each title obtained is used for generating the drawing data at S5. Namely, the above drawing data includes, in addition to each thumbnail, data for drawing a tab bar which emphasizes the tab corresponding to the thumbnail at the center of the screen (in other words, the thumbnail, which is subject to be focused, described later).

After the layout process of S5, the tab browser 50 assigns focus information, which identifies which of the histories and which of tab windows has the focused thumbnail (namely, the thumbnail in the selected state) in the history referencing mode (S6). Specifically, a flag, which indicates that the history is the subject to be focused, is assigned to the history of the thumbnail $TN_{CPa}$ which is to be drawn at the center of the screen, for example. After the assignment of the focus information, the drawing data is expanded in a video memory and the thumbnails are displayed on the screen (S7), and the execution of the thumbnail displaying process of FIG. 5 is completed.

After the execution of the thumbnail displaying process of FIG. 5 has been completed, the display on the screen is switched, for example, to the screen illustrated in FIG. 4 (*b*), and the state is switched to a user operation waiting state. If, for example, the decision key 113C is pressed in this state, then the tab browser 50 refers to the history of the focused thumbnail based on the focus information, and retrieves the Web page by accessing the URI which is associated with the history (or if the Web page is cached, then from the cache memory). Then, the mode returns from the history referencing mode to the normal mode, and the Web page is displayed on the active window. When the decision key 113C is pressed in the state of FIG. 4 (*b*), the tab browser 50 retrieves the Web page by accessing the URI which is associated with the thumbnail $TN_{CPa}$, and displays the screen illustrated in FIG. 4 (*a*).

Further, the tab browser 50 shifts the focus in accordance with the pressed directional key (namely, the thumbnail displayed at the center of the screen, which is the subject to be selected, is changed). FIG. 6 illustrates a flowchart of thumbnail changing process to change the thumbnail displayed. Using FIG. 6, the thumbnail changing process is explained.

According to the flowchart of FIG. 6, the tab browser 50 is in a user operation waiting state, and the tab browser 50 executes the process corresponding to the pressed directional key. For example, when the right directional key 113R is pressed (S11: right), the tab browser 50 stores the thumbnail $TN_{fw}$, which is arranged at the right part of the screen, in the working area as the thumbnail to be focused (S12). Next, as in the case of the processes from S2 to S4 in FIG. 5, the thumbnails which are arranged at the upper part, the lower part, the right part, and left part of the thumbnail $TN_{fw}$ are retrieved (S 16). Specifically, the thumbnail $TN_{CPa}$ (namely, the thumbnail immediately before the thumbnail $TN_{fw}$), the thumbnail $TN'_{fw}$ which is after the thumbnail $TN_{fw}$, the thumbnail $TN_{CPb}$, and the thumbnail $TN_{CPc}$ are retrieved (however, since the thumbnail $TN_{CPa}$, the thumbnail $TN_{CPb}$, and the thumbnail $TN_{CPc}$ have already been expanded in the working area, the thumbnail $TN'_{fw}$ is the only one thumbnail which is newly retrieved). Further, in parallel with the process of retrieving each thumbnail, titles corresponding to the thumbnails at the center of the screen, at the upper part of the screen, and at the lower part of the screen are obtained.

Following the process of S16, the tab browser 50 generates drawing data, as in the process S5 of FIG. 5 (S17). Specifically, the thumbnail $TN_{fw}$ is arranged at the center of the screen, the thumbnail $TN'_{fw}$ is arranged at the right part of the screen, the thumbnail $TN_{CPa}$ is arranged at the left part of the screen, the thumbnail $TN_{CPc}$ is arranged at the upper part of the screen, and the thumbnail $TN_{CPb}$ is arranged at the lower part of the screen, and the drawing data for drawing the tab bar which emphasizes the tab corresponding to the thumbnail at the center of the screen (here, the tab Ta, as in the previous case) is generated.

Following the process of S17, the tab browser 50 assigns the focus information to the thumbnail $TN_{fw}$ (S18) as in the processes of S6 and S7 of FIG. 5, and the tab browser 50 expands the drawing data in the video memory and displays the drawing data on the screen (S19). This completes the thumbnail changing process.

After the execution of the above thumbnail changing process has been completed, each thumbnail of the tab window Wa slides, and the subject of focus is shifted from the thumbnail $TN_{CPa}$ to the thumbnail $TN_{fw}$, and the display on the screen is switched to the display of FIG. 4 (*c*), for example. Further, the title indicated on the tab Ta is changed, and the title corresponding to the subject which is currently focused is explicitly noticed to a user. Furthermore, since the tab corresponding to the thumbnail which is the subject of focusing is highlighted, the user can visually understand which tab the history group (a group of thumbnails in the left and right directions of the screen), which is mainly browsed now, belongs to. Here, for example, when the decision key 113C is pressed, the tab browser 50 retrieves the Web page by accessing the URI which is associated with the thumbnail $TN_{fw}$, and displays the Web page on the screen.

When the left directional key 113L is pressed (S11: left), the thumbnail $TN_{bk}$ becomes the thumbnail which is to be focused (S13), and the processes from S16 to S19 are executed as in the previous case. In this manner, each thumbnail on the tab window Wa slides on the screen, and the subject of focus is shifted from the thumbnail $TN_{CPa}$ to the thumbnail $TN_{bk}$.

When the downward directional key 113D is pressed (S11: down), the thumbnail $TN_{CPb}$ becomes the thumbnail which is to be focused (S14), and the processes from S16 to S19 are executed as in the previous case. Specifically, at the process of S16, the thumbnail $TN''_{fw}$, which is after the thumbnail $TN_{CPb}$, and the thumbnail $TN''_{bk}$, which is immediately before the thumbnail $TN''_{fw}$, the thumbnail $TN_{CPa}$, and the thumbnail $TN_{CPc}$ are retrieved. Further, as in the case of the previous example, the titles corresponding to the thumbnails at the center of the screen and at the upper part and at the lower part of the screen are obtained, in parallel with the processes for retrieving the thumbnails. Next, the thumbnail $TN_{CPb}$, the thumbnail $TN''_{fw}$, the thumbnail $TN''_{bk}$, the thumbnail $TN_{CPa}$, and the thumbnail $TN_{CPc}$ are arranged at the center of the screen, at the right part of the screen, at the left part of the screen, at the upper part of the screen, and at the lower part of the screen, respectively, and the drawing data for drawing the tab bar which highlights the tab corresponding to the thumbnail at the center of the screen (here, the tab Tb) is generated (S17). Then, the focus information is assigned to the thumbnail $TN_{fw}$ (S18), and the displaying process is executed (S19). In this manner, the current page of each tab window slides as illustrated in FIG. 4 (*d*), and the subject of focus is shifted from the thumbnail $TN_{CPa}$ to the thumbnail $TN_{CPb}$, and the thumbnail $TN''_{fw}$ and the thumbnail $TN''_{bk}$ are displayed at left and right of the thumbnail $TN_{CPb}$. Further, the tab highlighted on the tab bar is changed. In this manner, the user can easily and visually understand that the main subject to be browsed has been changed to the one which belongs to the tabs (here, tabs from Ta to Tb) which are different from the tabs of last time.

When the upward directional key 113U is pressed (S11: up), the thumbnail $TN_{CPc}$ becomes the thumbnail to be focused (S15), and the processes from S16 to S19 are executed as in the case of the example of the downward directional key 113D. In this manner, the current page of each tab window slides, and the subject of focus is shifted from the thumbnail $TN_{CPa}$ to the thumbnail $TN_{CPc}$. The thumbnail after the $TN_{CPc}$ and the thumbnail immediately before the thumbnail $TN_{CPc}$ are displayed at left and right of the thumbnail $TN_{CPc}$.

A user can browse a desired thumbnail in all tab windows by switching the thumbnail to be focused through pressing each directional key, without performing switching operation of the tab window. With this configuration, since the need for conducting a troublesome user operation for selecting a tab window can be eliminated when referencing histories, it becomes possible to provide a seamless operational feeling for a user, without feeling the difference among tab windows of the referenced histories. With this configuration which realizes upgrading of operability brings remarkable effects, especially, to a terminal with a thin input interface such as a mobile telephone. The greater the number of tab windows which open on the tab browser is, the more prominent the effect appears.

The embodiment of the invention is described above. The invention is not limited to the above embodiment, and various modification can be made within the scope of the invention. For example, the timing of capturing a Web page is not limited to the timing of the embodiment. In another embodiment, for example, a Web page can be captured at the time when the Web page transits.

Further, in the embodiment, drawing data of a thumbnail to be displayed on the screen is generated each time the subject of focus is changed. However, in another embodiment, drawing data in which all thumbnails of all tab windows are arranged is generated at a time when the mode is switched to the history referencing mode (cf., FIG. 7). The former has an advantage that resource can be reduced, since the number of thumbnails which are read out from a history is small. The latter has an advantage, for example, that processing speed of the thumbnail changing process is enhanced, since it is not necessary to read out thumbnails from a history each time the subject of focus is changed.

Further, in another embodiment, the terminal device 10 can be configured so that another key (for example, a ten key) placed on the user interface device 113 is utilized to change the thumbnail which is the subject of focus.

Further, in the embodiment, the minimum necessary thumbnails corresponding to directional keys are displayed, but in another embodiment, many more thumbnails can be displayed. The former has an advantage that resource can be reduced, and the latter has an advantage that an intended history can be found more easily.

Also, as a configuration to further reduce resource, for example, only the thumbnail which is the subject of focus can be displayed on the screen. In this configuration, when the upward directional key 113U or the downward directional key 113D is pressed, the thumbnail of the neighboring tab window becomes the subject of focus, and it is displayed on the screen. Furthermore, when the right directional key 113R or the left directional key 113L is pressed, the thumbnail after or immediately before the thumbnail which was the subject of focus becomes the new subject of focus, and it is displayed on the screen.

Further, the display 111 can be a touch panel. In this case, as a terminal device, a device whose display 111 is relatively large can be considered, for example. The tab browser 50 of such a terminal device generates drawing data in which all thumbnails are arranged as a matrix as shown in FIG. 7, for example, when the mode transits to the history referencing mode, for instance. In more detail, a thumbnail of each tab window which is associated with each row is arranged in a time series in the column direction. For example, when a user makes a single tap on a certain thumbnail on the touch panel, the tab browser 50 changes the subject of focus to the thumbnail. Further, when a certain thumbnail is double tapped, the tab browser 50 accesses the URI which is associated with the thumbnail and retrieves the Web page, and displays it on the screen. With this configuration, a user can refer to a history and can access the URI of the intended history with a simpler operation.

Further, in another embodiment, a thumbnail group (for example, the one which is arranged in a matrix as above) can be zoomed in and out in a history referencing mode. Visibility of an intended thumbnail can be enhanced through performing a zoom-in operation. Further, more thumbnails can be displayed within one screen through performing a zoom-out operation. Furthermore, it can be configured such that when a thumbnail is zoomed in to a predetermined magnification, the tab browser 50 accesses an URI which is associated with the thumbnail and retrieves the Web page, and displays it on the screen.

Further, in another embodiment, for example, if the "Back" button is selected when the display on the screen is as shown in FIG. 8(a), then the display transits to the displays shown in FIG. 8(b) and FIG. 8(c), in this order. Namely, after the "Back" is selected, first, the mode transits to the history referencing mode, and a screen in which the thumbnail $TN_{bk}$ is arranged at the center of the screen is generated and displayed. Next, after a predetermined time has passed, the mode returns to the normal mode and the Web page corresponding to the thumbnail $TN_{bk}$ is accessed, and the Web page is displayed. Here, the above predetermined time can be a time in which a user can sensuously catch which thumbnails are displayed at the upper part, at the lower part, at the right part, and at the left part of the screen. Namely, according to this embodiment, an effect such that a user can sensuously catch which Web page is browsed on each tab.

Further, an embodiment can be considered in which when a tab corresponding to a thumbnail which is the subject of focus is placed on the right edge (or the left edge) on the tab bar, the thumbnail is not displayed at the upper part (or at the lower part) of the screen in the history referencing mode. Specifically, when the tab corresponding to the thumbnail which is the subject of focus is the tab Ta (or the tab Tc), the thumbnail corresponding to the tab Tc (or the tab Ta) is not displayed at the upper part (or at the lower part) of the screen in the history referencing mode. Since four thumbnails are displayed on the screen, an effect to reduce resource can be expected.

Further, in the example of the screen configuration in the history referencing mode explained with referring to FIG. 4 (b), FIG. 4 (c), and FIG. 4 (d), the thumbnail images are displayed at the center of the screen and at the upper part, at the lower part, at the left part, and at the right part of the screen. However, a configuration can be considered in which the thumbnail images at the upper part and at the lower part of the screen (namely, the lastly displayed Web contents with windows except for the active window) are not shown to a user. FIG. 9 is a diagram illustrating an example of screen display with such a configuration. In FIG. 9, messages M1 and M2 ("to the previous tab window," "to the next tab window") which indicate that the tab is switched are displayed, instead of the thumbnail images which should be displayed at the upper part and at the lower part of the screen. By pressing the upward directional key or the downward directional key, a user can move to "the previous tab window" or to "the next tab window." Further, the display screen of FIG. 9 can be configured such that the thumbnail images which should be displayed at the upper part of the screen or at the lower part of the screen are placed outside of the screen.

Figure 1:
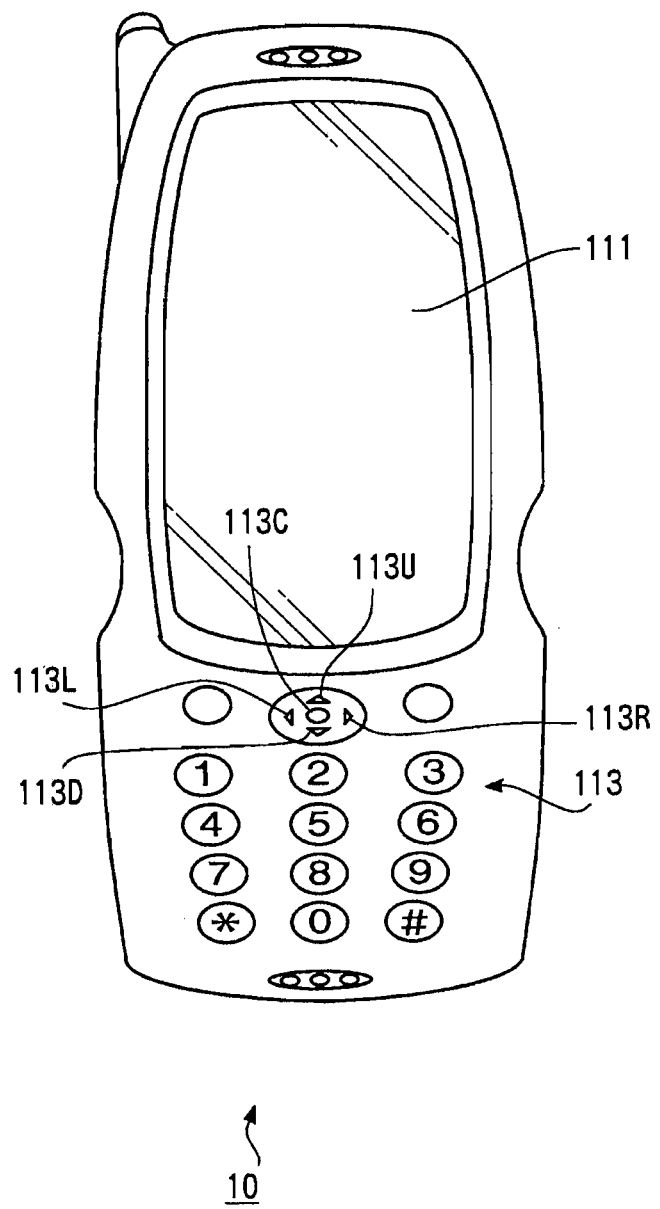
FIG. 1 is a diagram illustrating an external view of a terminal device according to an embodiment of the invention.
Figure 2:
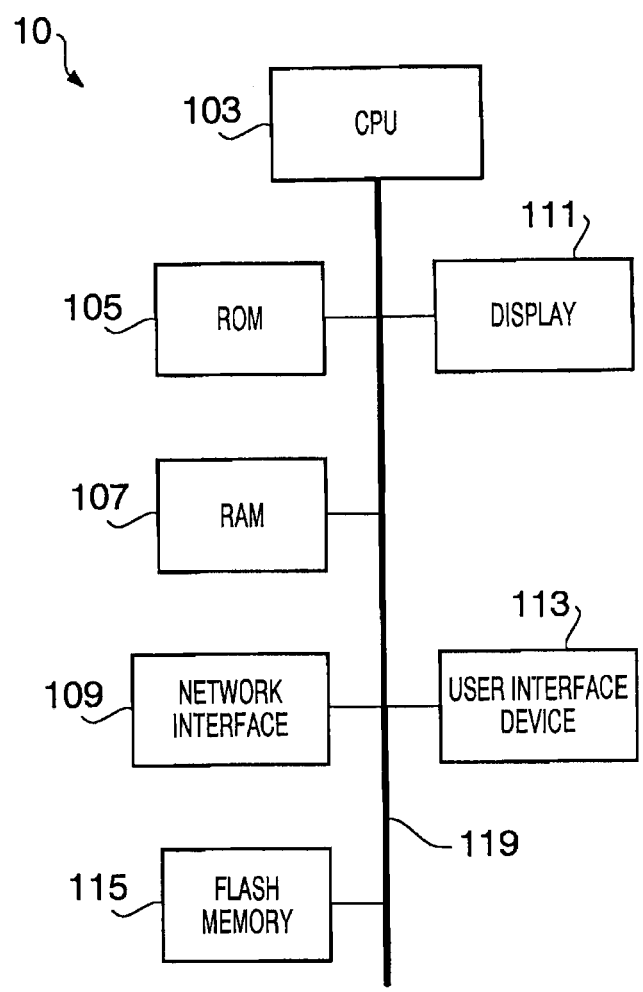
FIG. 2 is a block diagram illustrating architecture of a terminal device according to an embodiment of the invention.
Figure 3:
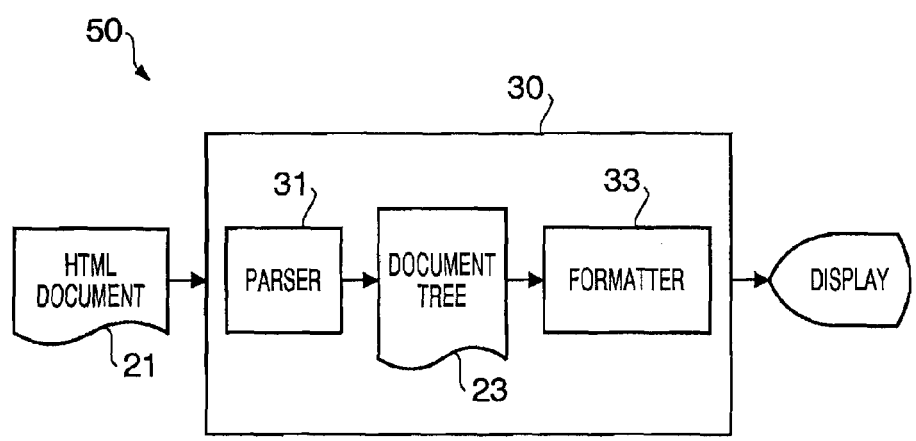
FIG. 3 is a functional block diagram of a browser engine included in a browser according to an embodiment of the invention.
Figure 4:
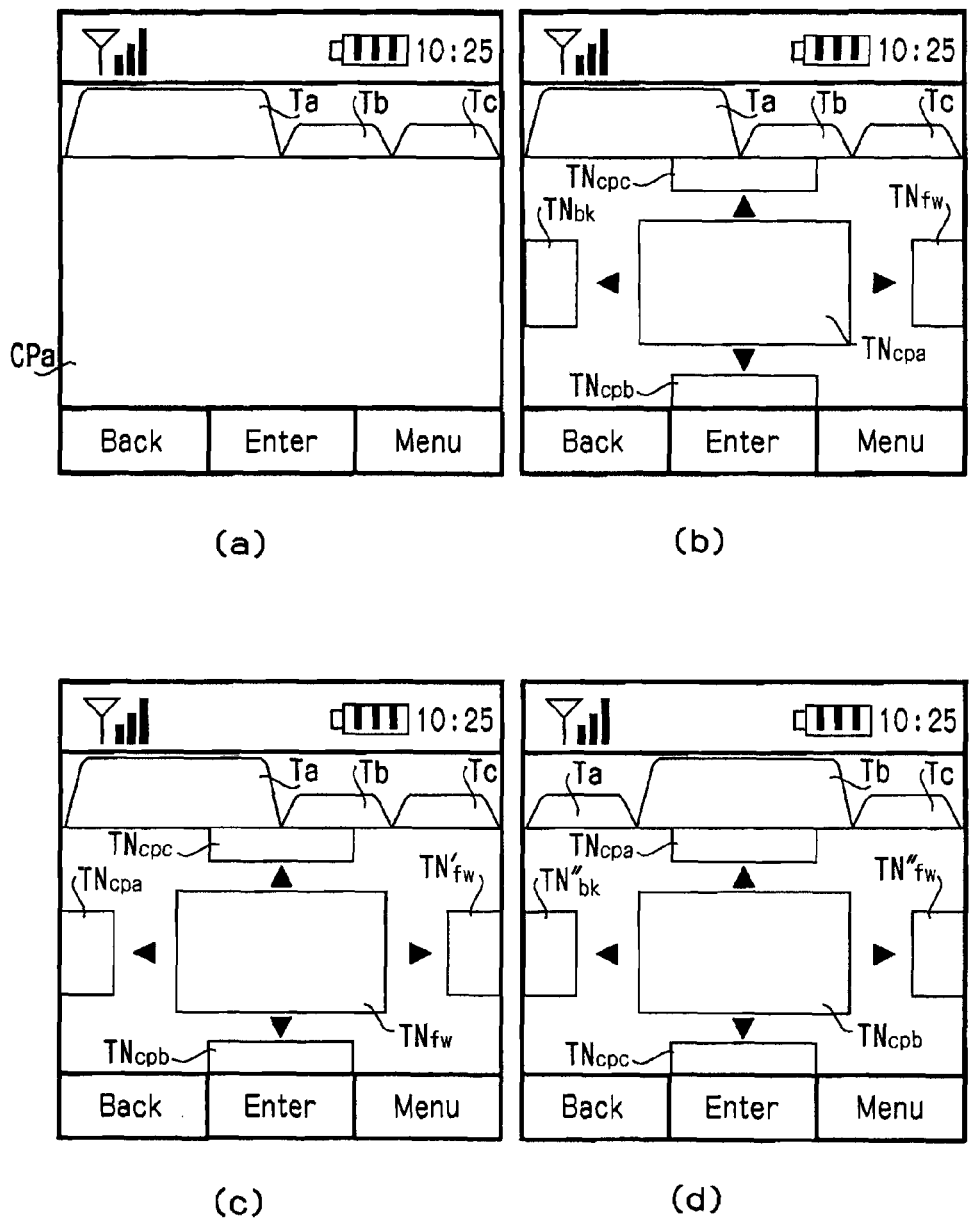
FIG. 4 is a diagram illustrating an example of a screen displayed on a tab browser in an embodiment of the invention.
Figure 5:
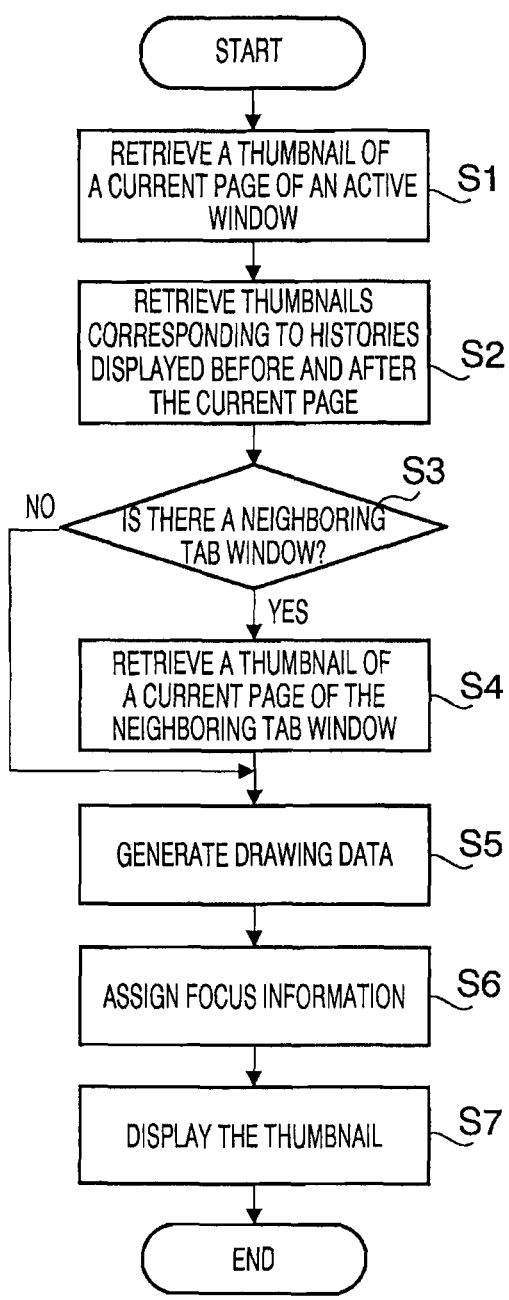
FIG. 5 is a diagram illustrating a flowchart of a thumbnail displaying process executed by a tab browser in an embodiment of the invention.
Figure 6:
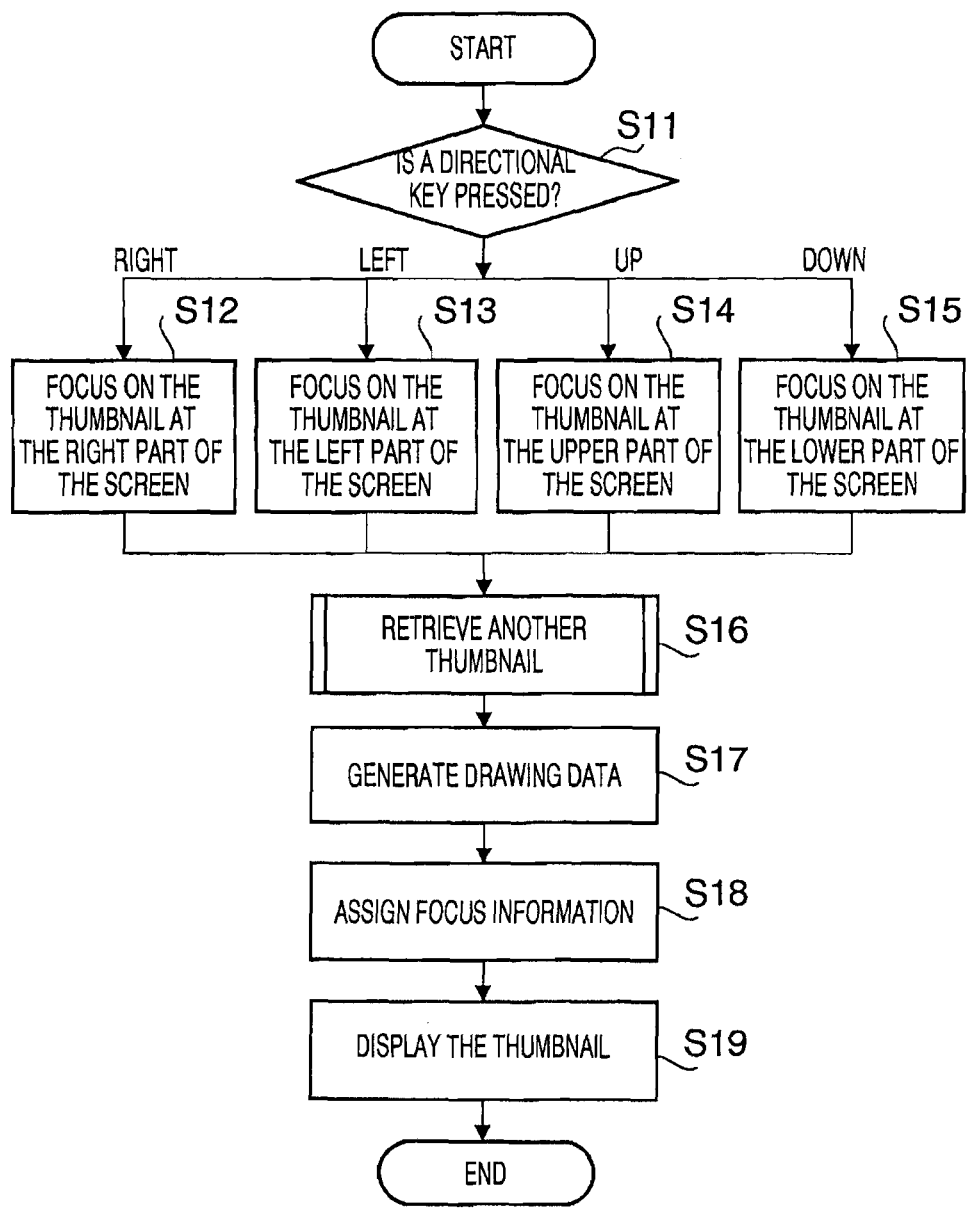
FIG. 6 is a diagram illustrating a flowchart of a thumbnail changing process executed by a tab browser in an embodiment of the invention.
Figure 7:
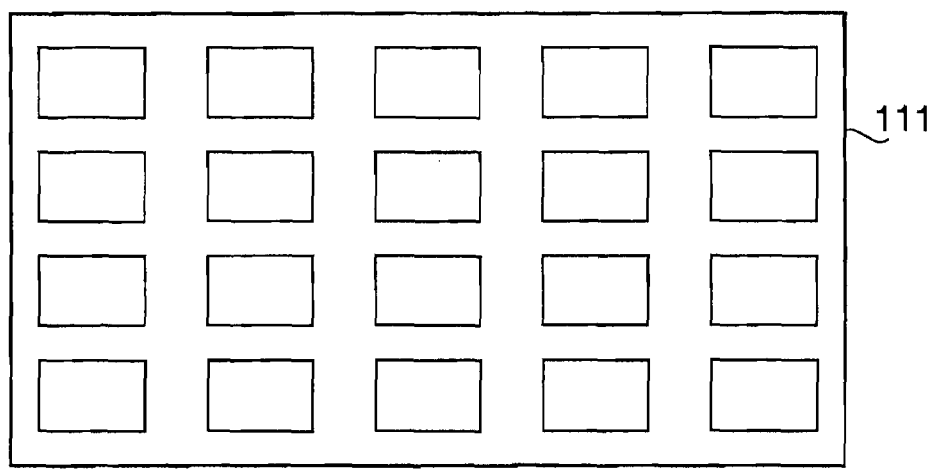
FIG. 7 is a diagram illustrating an example of a screen displayed on a tab browser in another embodiment of the invention.
Figure 8:
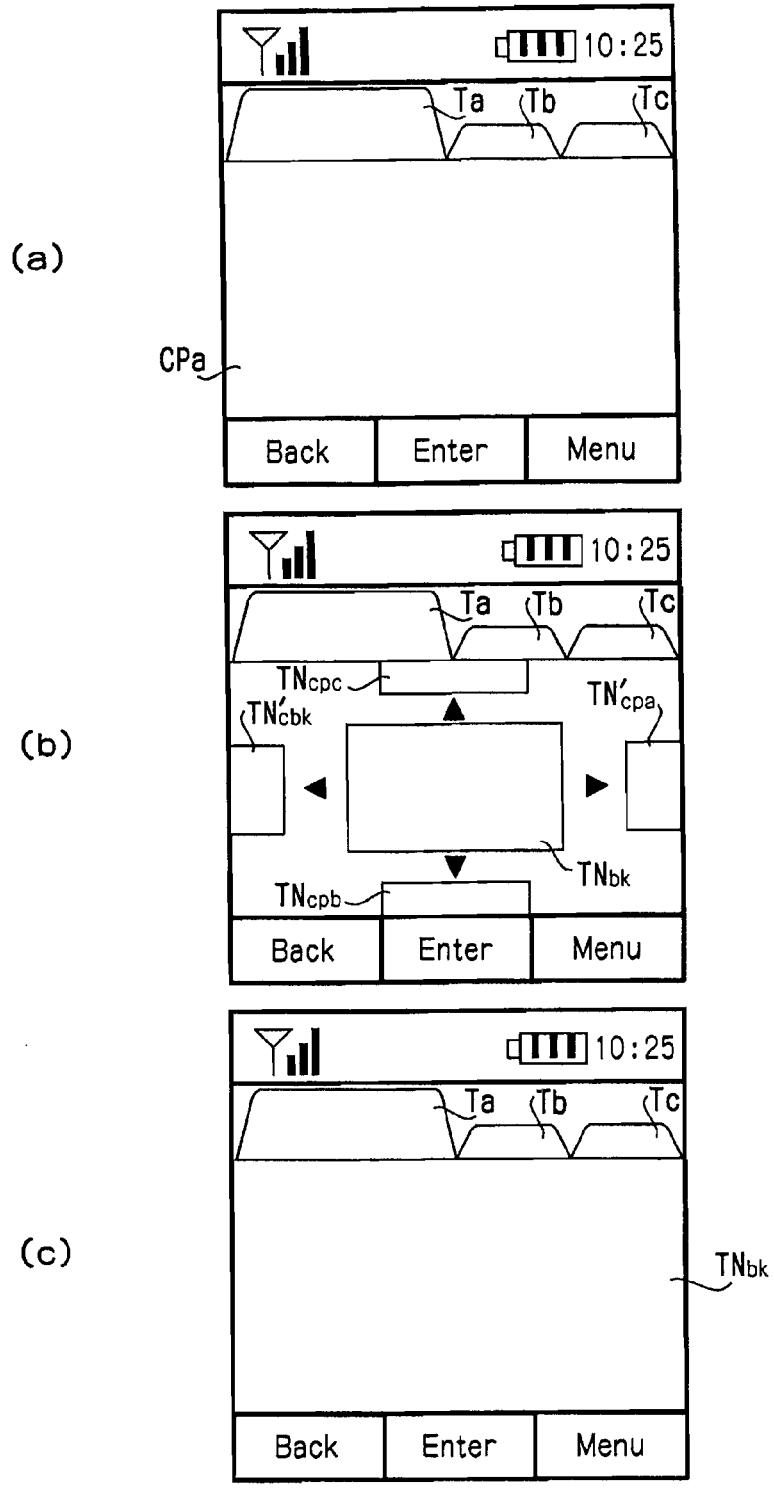
FIG. 8 is a diagram illustrating an example of a screen displayed on a tab browser in another embodiment of the invention.
Figure 9:
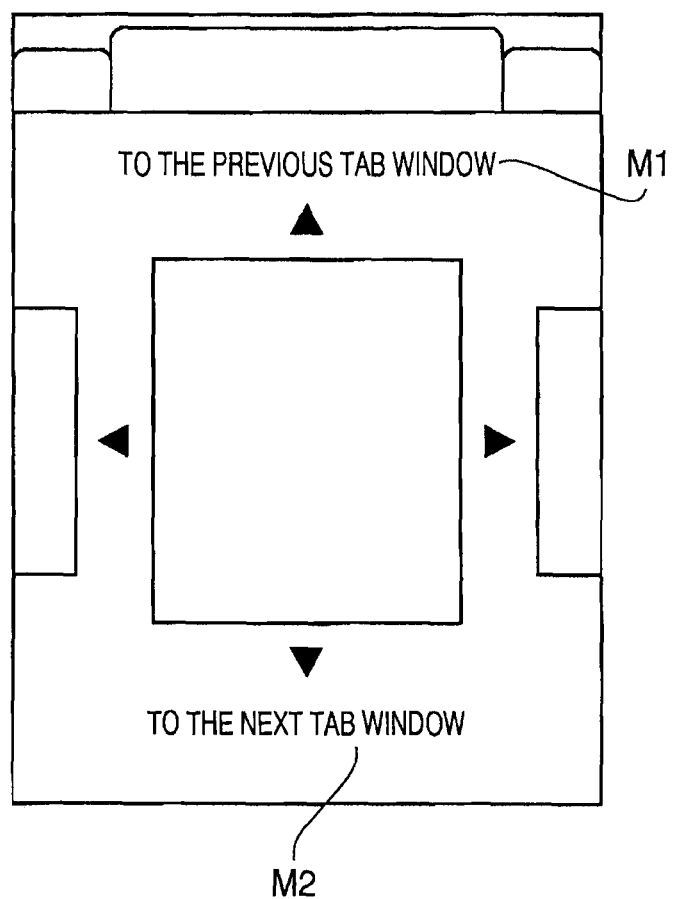
FIG. 9 is a diagram illustrating another example of a screen display of a thumbnail image in a history reference mode.

What is claimed is:

1. A terminal device for accessing Web contents individually for a plurality of tab windows, comprising:
at least one memory that has stored thereon non-transitory computer-readable instructions executed by a processor;
a history storing unit configured to associate each of histories of Web contents with predetermined image information, wherein the Web contents were displayed in the plurality of tab windows, and
the history storing unit further configured to store the histories of the Web contents and separately manage the histories of the Web contents for each tab window of the plurality of tab windows;
an input unit configured to receive user input operations;
an image retrieving unit configured to retrieve the image information for the plurality of tab windows by referring to the histories of the Web contents of the plurality of tab windows, the image information retrieved in response to the input unit receiving a predetermined input operation;
an image arranging unit configured to arrange the retrieved image information for each tab window of the plurality of tab windows in different rows, with each row corresponding to each tab window, by referring to the separately managed histories of the Web contents of the plurality of tab windows, and
wherein arranging the retrieved image information comprises arranging the retrieved image information in a time series by referring to the separately managed histories of the Web contents of the plurality of tab windows, and the image arranging unit further configured to display the arranged image information on a screen;
a focusing unit configured to focus on one piece of the arranged image information in response to the input operation; and
wherein each tab window of the plurality of tab windows was opened within a single main window, and wherein the pieces of image information representing the Web content accessed within a currently active tab window are displayed on the single main window by navigating in the horizontal direction and the pieces of image information representing the Web content accessed from selecting different tab windows other than the active tab window are displayed on the single main window by navigating in the vertical direction.

2. The terminal device according to claim 1, wherein the input unit comprises a first directional key to shift a focus in a first direction, and a second directional key to shift the focus in a second direction which is perpendicular to the first direction, and
wherein the focusing unit is configured to shift the focus in the first direction in response to detecting an operation of the first directional key and shift the focus in a second direction in response to detecting an operation of the second directional key, and change the image information to be focused.

3. The terminal device according to claim 2, wherein the image arranging unit is configured to arrange image information corresponding to histories of the Web contents of an active tab window in a row corresponding to the first direction in a time series, and arrange image information corresponding to a Web content which is lastly displayed by a tab window except for the active tab window in the second direction.

4. The terminal device according to claim 1, wherein the image arranging unit is configured to arrange image information corresponding to histories of the Web contents of an active tab window in a row corresponding to a first direction, at the same time, for a Web content which is lastly displayed by a tab window except for the active tab window, the image arranging unit is configured to arrange a message in a second direction, the message indicating an availability to access the tab window.

5. The terminal device according to claim 1,
further comprising:
a display magnification changing unit configured to change a magnification on the pieces of image information arranged on the screen.

6. The terminal device according to claim 5, wherein when a magnification on a piece of image information which is currently displayed attains a predetermined magnification, the terminal device accesses a Web content by referring to a history corresponding to the piece of image information.

7. The terminal device according to claim 1, wherein when an input operation to decide to select a piece of image information which has been focused is made, the terminal device accesses a Web content by referring to a history corresponding to the piece of image information which has been focused.

8. The terminal device according to claim 1, further comprising:
a thumbnail generating unit configured to generate a thumbnail of a Web content, which has been accessed, as the predetermined image information.

9. The terminal device according to claim 1, wherein the input unit is a touch panel, and the focusing unit is configured to focus on a piece of image information which is selected on the touch panel.

10. A terminal device for accessing Web contents individually for a plurality of tab windows, comprising:

at least one memory that has stored thereon non-transitory computer-readable instructions executed by a processor;
a history storing unit configured to associate each of histories of Web contents with predetermined image information, wherein the Web contents were displayed in the plurality of tab windows, and
the history storing unit further configured to store the histories of the Web contents sand separately manage the histories of the Web contents for each tab window of the plurality of tab windows;
an input unit configured to receive user input operations;
an image retrieving unit configured to retrieve pieces of image information corresponding to a first Web content which is in a state in which the first Web content is currently browsed on an active tab window, second Web contents which are accessed before and after the first Web content within the active tab window, and third Web contents which are lastly displayed on other tab windows of the plurality of tab windows except for the active tab window, respectively, by referring to the separately managed histories of the Web contents of each tab window of the plurality of tab windows;
a first piece of image information of the first Web content, which is in the state in which the first Web content is browsed on the active tab window, at the center of the active tab window,
at least a portion of second pieces of image information of the second Web contents, which are accessed before and after the first Web content within the active tab window, at a left part and at a right part of the center of the active tab window,
at least a portion of third the pieces of image information of the third Web contents, which are lastly displayed on the other tab windows of the plurality of tab windows except for the active tab window, at an upper part and at a lower part of the center of the active tab window,
wherein each tab window of the plurality of tab windows was opened within a single main window, and wherein the pieces of image information representing the Web content accessed within a currently active tab window are displayed on the single main window by navigating in the horizontal direction and the pieces of image information representing the Web content accessed from selecting different tab windows other than the active tab window are displayed on the single main window by navigating in the vertical direction.

11. The terminal device according to claim 10, wherein the input unit comprises a first directional key for moving the focus of pieces of image information in the horizontal direction of the screen and a second directional key for moving the focus of pieces of image information in the vertical direction of the screen;
and wherein the terminal device further comprises:
an image arrangement changing unit configured to change the arrangement of the pieces of image information on the screen to cause the pieces of image information placed in the horizontal direction to slide in the horizontal direction in response to operations on the first directional key, the pieces of image information of each tab window placed in the vertical direction to slide in the vertical direction in response to operations on the second directional key, and wherein the pieces of image information of the tab window corresponding to the piece of image information placed at the center of the screen are arranged in a time series in the horizontal direction of the screen.

12. The terminal device according to claim 10, wherein the tab windows except for the active tab window are tab windows having tabs that are neighboring a tab of the active tab window on a tab bar of the main tab window.

13. A history management method for accessing Web contents individually for a plurality of tab windows, comprising:
at least one memory that has stored thereon non-transitory computer-readable instructions executed by a processor;
a history storing step of associating each of histories of Web contents with predetermined image information, wherein the Web contents were displayed in the plurality of tab windows, and
the history storing step further storing the histories of the Web contents and separately manage the histories of the Web contents for each tab window of the plurality of tab windows;
an image retrieving step of retrieving the image information by referring to the histories of the Web contents of each tab window of the plurality of tab windows, when a predetermined input operation by a user is received;
an image arranging step of arranging the retrieved image information for each tab window of the plurality of tab windows in different rows, with each row corresponding to each tab window, in a time series by referring to the separately managed histories, and
the image arranging step further displaying the arranged image information on a screen;
a focusing step of focusing on one piece of the arranged image information in response to the input operation; and
wherein each tab window of the plurality of tab windows was opened within a single main window, and wherein the pieces of image information representing the Web content accessed within a currently active tab window are displayed on the single main window by navigating in the horizontal direction and the pieces of image information representing the Web content accessed from selecting different tab windows other than the active tab window are displayed on the single main window by navigating in the vertical direction.

14. The history management method according to claim 13, wherein the image arranging step arranges image information corresponding to histories of the Web contents of an active tab window in a row corresponding to a first direction in a time series, at the same time, for a Web content which is lastly displayed by a tab window except for the active tab window, the image arranging step arranges a message in a second direction, the message indicating an availability to access the tab window.

15. The history management method according to claim 13, further comprising:
a display magnification changing step of changing a magnification of the pieces of image information arranged on the screen.

16. The history management method according to claim 13, wherein when a magnification on a piece of image information which is currently displayed reaches a predetermined magnification, a Web content is accessed by referring to a history corresponding to the piece of image information.

17. The history management method according to claim 13, wherein when an input operation to decide to select a piece of image information which has been focused is made, a Web content is accessed by referring to a history corresponding to the piece of image information.

18. The history management method according to claim 13, further comprising:

a thumbnail generating step of generating a thumbnail of a Web content, which has been accessed, as the predetermined image information.

19. A history management method for accessing Web contents individually for a plurality of tab windows, comprising:
at least one memory that has stored thereon non-transitory computer-readable instructions executed by a processor;
a history storing step of associating each of histories of the Web contents with predetermined image information, storing the histories of the Web contents, and separately managing the histories of the Web contents can be separately managed for each tab window of the plurality of tab windows, wherein the Web contents were displayed in the plurality of tab windows;
an image retrieving step of retrieving pieces of image information corresponding to a Web content which is in a state in which the Web content is currently browsed on an active tab window, Web contents which are accessed before and after the Web content within the active tab window, and Web contents which are lastly displayed on other tab windows of the plurality of tab windows except for the active tab window, respectively, by referring to histories of the Web contents of each window, when a predetermined input operation by a user is received;
an image arranging step of arranging:
a first piece of image information of the Web content, which is in the state in which the Web content is browsed, at the center of the active tab window,
at least a portion of second pieces of image information of the Web contents, which are accessed before and after the first Web content, at a left part and at a right part of the center of the active tab window, and
at least a portion of third pieces of image information of the Web contents, which are lastly displayed on the other tab windows of the plurality of tab windows except for the active tab window, window are placed at an upper part and at a lower part of the active tab window;
a focusing step of focusing on one of the arranged pieces of image information; and wherein each tab window of the plurality of tab windows was opened within a single main window, and wherein the pieces of image information representing the Web content accessed within a currently active tab window are displayed on the single main window by navigating in the horizontal direction and the pieces of image information representing the Web content accessed from selecting different tab windows other than the active tab window are displayed on the single main window by navigating in the vertical direction.

20. The history management method according to claim 19, further comprising:
an image arrangement changing step of changing the arrangement of the pieces of image information on the screen to cause:
in response to receiving an input operation for moving a subject of focus to the pieces of image information at the left part or at the right part of the screen, sliding the pieces of image information placed in the horizontal direction in a direction corresponding to the input operation;
in response to receiving an input operation for moving the subject of focus to the pieces of image information at the upper part or at the lower part of the screen, sliding the pieces of image information of each tab window placed in the vertical direction in a direction corresponding to the input operation; and the pieces of image information of the tab window corresponding to the piece of image information placed at the center of the screen to be arranged in a time series in the horizontal direction of the screen.

21. The history management method according to claim 19, wherein the tab windows except for the active tab window are tab windows tabs that are neighboring a tab of the active tab window on a tab bar of the main tab window.

22. A non-transitory computer usable storage medium having computer readable instruction stored thereon, which, when executed by a processor of a terminal device, configures the processor to perform the steps of:
at least one memory that has stored thereon non-transitory computer-readable instructions executed by a processor;
associating each of histories of Web contents with predetermined image information, wherein the Web contents were displayed in a plurality of tab windows;
storing the histories of the Web contents and separately managing the histories of the Web contents can be separately managed for each tab window of the plurality of tab windows;
retrieving the image information by referring to the separately managed histories of the Web contents of each tab window of the plurality of tab windows, when a predetermined input operation by a user is received;
arranging the retrieved image information for each tab window in different rows, which is made to be in correspondence with each tab window, in a time series by referring to the separately managed histories, and displaying the arranged image information on a screen;
focusing on one piece of the arranged image information in response to the input operation
and
wherein each tab window of the plurality of tab windows was opened within a single main window, and wherein the pieces of image information representing the Web content accessed within a currently active tab window are displayed on the single main window by navigating in the horizontal direction and the pieces of image information representing the Web content accessed from selecting different tab windows other than the active tab window are displayed on the single main window by navigating in the vertical direction.

23. A non-transitory computer usable storage medium having computer readable instruction stored thereon, which, when executed by a processor of a terminal device, configures the processor to perform the steps of:
at least one memory that has stored thereon non-transitory computer-readable instructions executed by a processor;
associating each of histories of Web contents with predetermined image information, wherein the Web contents were displayed in a plurality of tab windows; and
storing the histories of the Web contents and separately managing the histories of the Web contents for each tab window of the plurality of tab windows;
retrieving pieces of image information corresponding to a first Web content which is in a state in which the first Web content is currently browsed on an active tab window, second Web contents which are accessed before and after the first Web content within the active tab window, and third Web contents which are lastly displayed on other tab windows of the plurality of tab windows except for the active tab window, respectively, by referring to the separately managed histories of the Web contents of each tab window of the plurality of tab windows, when a predetermined input operation by a user is received;

arranging a first piece of image information of the first Web content, which is in the state in which the first Web content is browsed, at the center of the active tab window;

arranging at least a portion of second pieces of image information of the second Web contents, which are accessed before and after the first Web content within the active tab window, at a left part and at a right part of the center of the active tab window:

arranging at least a portion of third pieces of image information of the third Web contents, which are lastly displayed on the other tab windows of the plurality of tab windows except for the active tab window, at an upper part and at a lower part of the active tab window;

focusing on one of the arranged pieces of image information: and wherein each tab window of the plurality of tab windows was opened within a single main window, and wherein the pieces of image information representing the Web content accessed within a currently active tab window are displayed on the single main window by navigating in the horizontal direction and the pieces of image information representing the Web content accessed from selecting different tab windows other than the active tab window are displayed on the single main window by navigating in the vertical direction.

* * * * *